United States Patent [19]

Hartman

[11] Patent Number: 4,881,603
[45] Date of Patent: Nov. 21, 1989

[54] TOW FRAME
[76] Inventor: LeRoy Hartman, Rte. 2, Box 79A, Grainfield, Kans. 67737
[21] Appl. No.: 286,255
[22] Filed: Dec. 19, 1988
[51] Int. Cl.[4] ............................................. A01B 73/00
[52] U.S. Cl. ................................... 172/311; 172/313; 172/456
[58] Field of Search ............... 172/310, 311, 313, 624, 172/625, 626, 456, 679, 644, 776; 280/411.1, 412, 413, 656; 56/6, 228

[56] References Cited

U.S. PATENT DOCUMENTS

| | | | |
|---|---|---|---|
| 2,139,200 | 12/1938 | Moyer | 172/311 X |
| 3,064,996 | 11/1962 | Roppel | 172/311 X |
| 3,738,682 | 6/1973 | Ritter | 280/412 X |
| 4,113,273 | 9/1978 | Gates | 172/311 X |
| 4,178,010 | 12/1979 | Gerber | 172/311 X |
| 4,213,628 | 7/1980 | Hardesty | 280/412 |
| 4,381,118 | 4/1983 | Weeks | 280/412 |
| 4,577,881 | 3/1986 | Gerber | 172/311 X |

FOREIGN PATENT DOCUMENTS 8502971  7/1985  PCT Int'l Appl. ............... 172/311

Primary Examiner—Randolph A. Reese
Assistant Examiner—Jeffrey L. Thompson
Attorney, Agent, or Firm—Litman, McMahon & Brown

[57] ABSTRACT

A tow frame for agricultural implements, such as seed drills, is provided. The tow frame includes a primary subframe for attaching to a tow vehicle and to an agricultural implement. A pair of wing subframes are hingedly mounted on opposite sides of the primary subframe. Second and third implements may be coupled to the wing subframes. The tow frame is foldable between a field configuration with the implements substantially transversely aligned and a transport configuration with the wing subframes folded rearwardly whereby the second and third implements are each positioned partly behind the first implement.

15 Claims, 3 Drawing Sheets

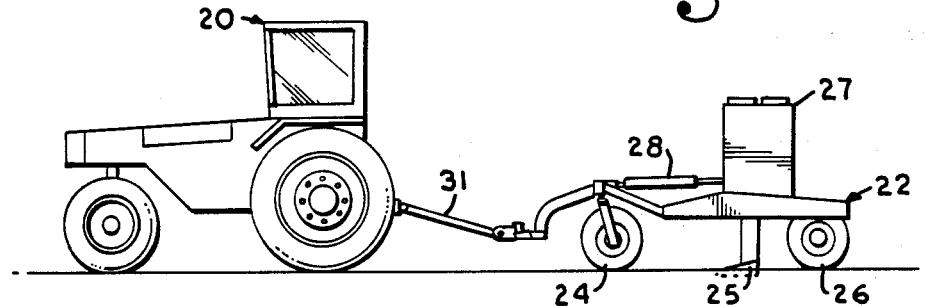
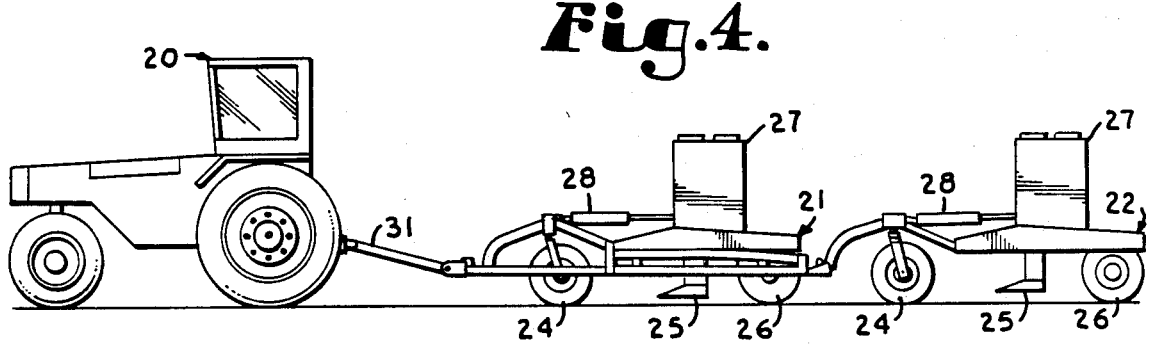
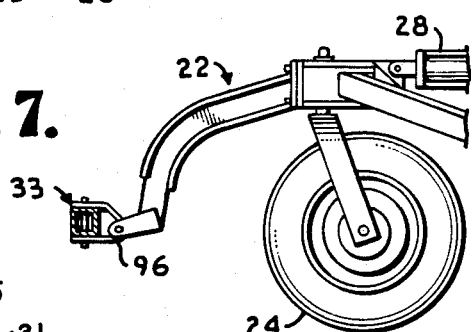
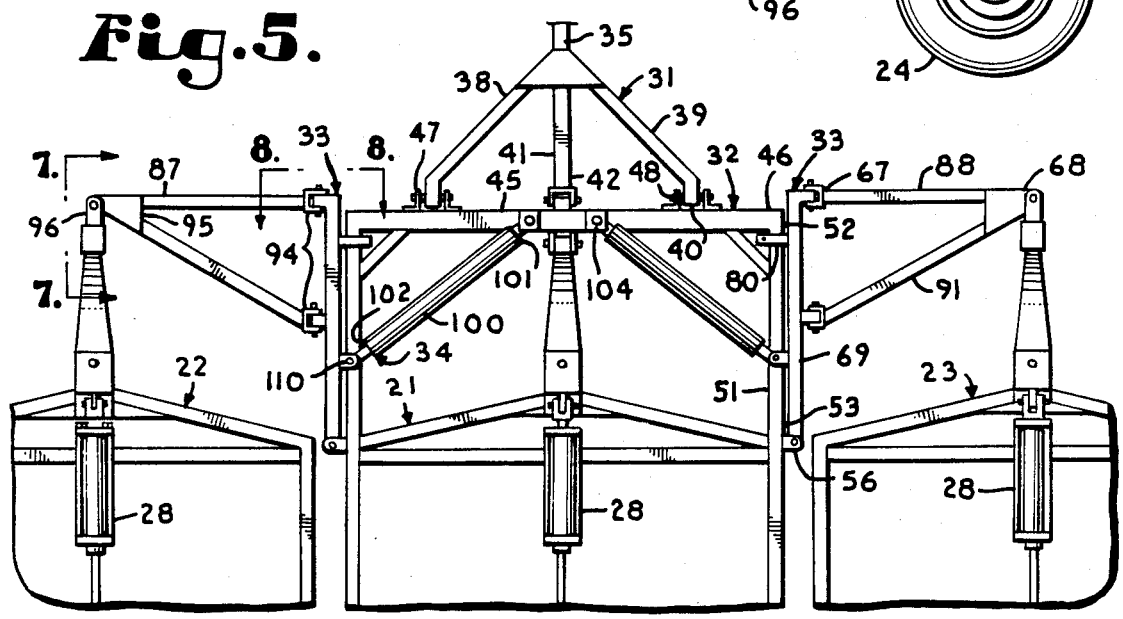

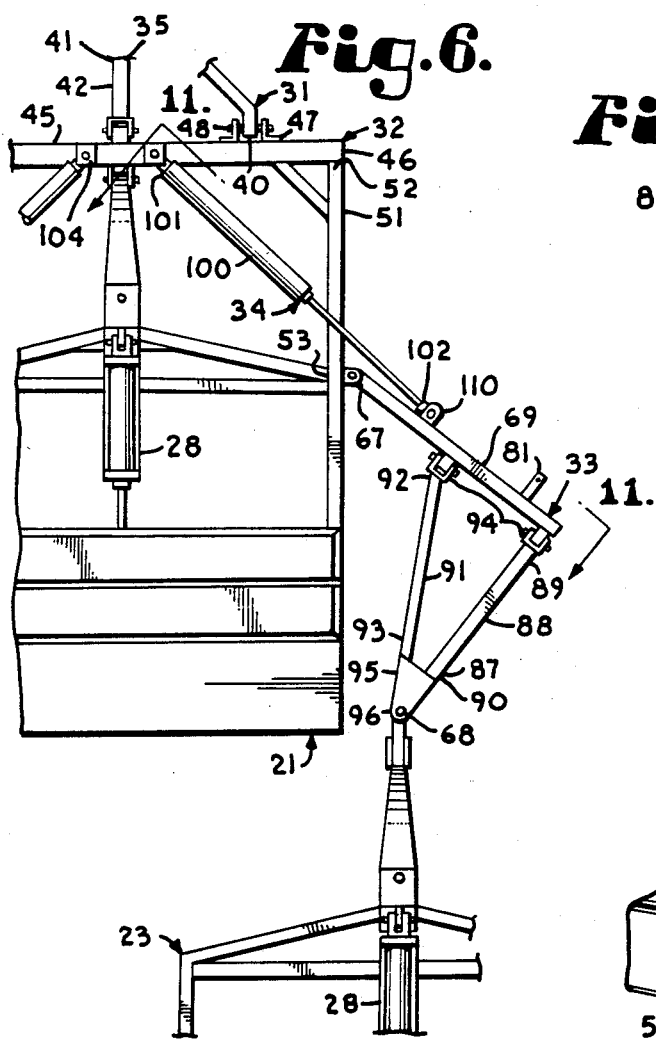
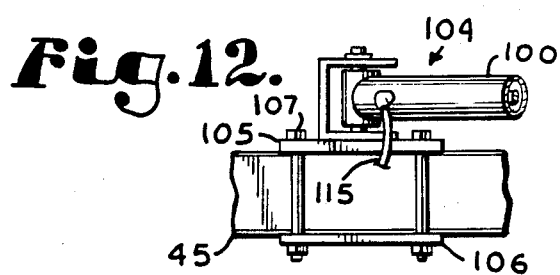

TOW FRAME

BACKGROUND OF THE INVENTION

1. Field of the Invention

The present invention relates generally to tow frames, more particularly to folding tow frames, and specifically to a foldable tow frame for seed planters.

2. Description of the Related Art

Tow vehicles, such as tractors, are commonly used in agricultural and other operations for pulling a wide variety of equipment, including field-working implements.

In modern, mechanized agricultural practice, efficient utilization of equipment and workers is highly desirable. Hence, field-working implements are often deployed simultaneously in multiple groups behind single tow vehicles to achieve the maximum possible field coverage with each pass of the equipment. Relatively large, high-powered tractors are currently available for drawing three or more individual implements simultaneously. It will be appreciated that such operations are relatively efficient because only a single operator and a single tractor are required for pulling several implements.

Seed drills are a type of agricultural implement commonly drawn by tractors and typically include shoes or disks (i.e. openers) for opening the soil, metering mechanisms for dispensing the seeds and press wheels for closing the ground over the newly-deposited seeds. Seed drills are available with alternative combinations of tools for planting various crops in fields with various conditions.

Seed drills have heretofore been available in a range of widths. For example, John Deere seed drills have been available from Deere & Company of Moline, Ill. in nominal widths of eight, ten, twelve and fourteen feet. Such seed drills can be combined to form ganged implements with widths of twenty-four feet or more. Although relatively wide implements tend to be efficient in operation because they cover relatively wide field swaths, they also tend to present transportation and storage difficulties. To transport and store such ganged implements, it is often necessary to uncouple them for individual transportation and storage. Public roads and existing equipment storage buildings are often unable to accommodate relatively wide implements. Operators of such implements may find it necessary to disassemble them so that their individual components can be transported over public roads and stored in existing storage buildings.

As an alternative to breaking down the implements, folding implements have been devised which are foldable between field and transport configurations. For example, Great Plains Manufacturing, Inc. of Assaria, Kans. has marketed a folding seed drill with a field width of thirty feet and a transport width of fifteen feet and two inches. The Great Plains drill includes a transverse center section and a pair of wing sections which fold between transversely-extending field positions and longitudinally-extending transport positions. In its transport configuration, the Great Plains folding drill may be towed on roads that would not be open to it in its full-width field configuration. However, the folding mechanisms of such implements tend to be relatively complex whereby the folding implements themselves tend to be relatively expensive. Also, a large number of individual implements, such as the seed drills described above, are presently in use and their owners are reluctant to replace them with expensive new folding equipment, even though certain advantages could be gained thereby.

The tow frame of the present invention addresses the aforementioned problems.

SUMMARY OF THE INVENTION

In the practice of the present invention, a tow frame is provided for connecting first, second and third implements to a tow vehicle. The tow frame includes a yoke subframe for hitching to the tow vehicle. A primary subframe is connected to the yoke subframe and may be hitched to the first implement. A pair of wing subframes are hingedly mounted on opposite sides of the primary subframe and each is adapted for hitching to one of the second and third implements. The tow frame is foldable between a field configuration with the implements transversely aligned and a transport configuration with the wing subframes folded rearwardly and the second and third implements each positioned partly behind the first implement.

OBJECTS AND ADVANTAGES OF THE PRESENT INVENTION

The principal objects and advantages of the present invention include: providing a tow frame for multiple implements; providing such a tow frame which is adapted for use with existing, individual implements; providing such a tow frame which is foldable; providing such a tow frame which is foldable between field and transport configurations; providing such a tow frame which is adapted for towing and storing implements in a relatively narrow, transport configuration; providing such a tow frame which enables multiple implements to be towed over existing roadways and stored in existing barns; providing such a tow frame which is relatively simple and easy to manipulate between field and transport configurations; providing such a tow frame which is articulated whereby the implements connected thereto conform to the ground contours in operation; and providing such a tow frame which is economical to manufacture, efficient in operation, capable of a long operating life and particularly well adapted for the proposed usages thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWING

FIG. 3 is a side elevational view of the tow frame in its field configuration.

FIG. 4 is a side elevational view of the tow frame in its transport configuration.

FIG. 5 is an enlarged, top plan view of the tow frame, shown in its field configuration.

FIG. 6 is an enlarged, fragmentary top plan view of the tow frame, shown folded to its transport configuration.

FIG. 7 is an enlarged, fragmentary, side elevational view of the tow frame, as viewed generally along lines 7—7 in FIG. 5.

FIG. 8 is an enlarged, fragmentary, front elevational view of the tow frame, as viewed generally along lines 8—8 in FIG. 5.

FIG. 9 is an enlarged, fragmentary top plan view of the tow frame particularly showing the area indicated in FIG. 8.

FIG. 10 is an enlarged, fragmentary, side elevational view of the tow frame, as viewed generally along lines 10—10 in FIG. 5.

FIG. 11 is an enlarged, fragmentary, vertical cross-sectional view of the tow frame, as viewed generally along lines 11—11 in FIG. 6.

FIG. 12 is an enlarged, fragmentary, rear elevational view of the tow frame, as viewed generally along lines 12—12 in FIG. 5.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
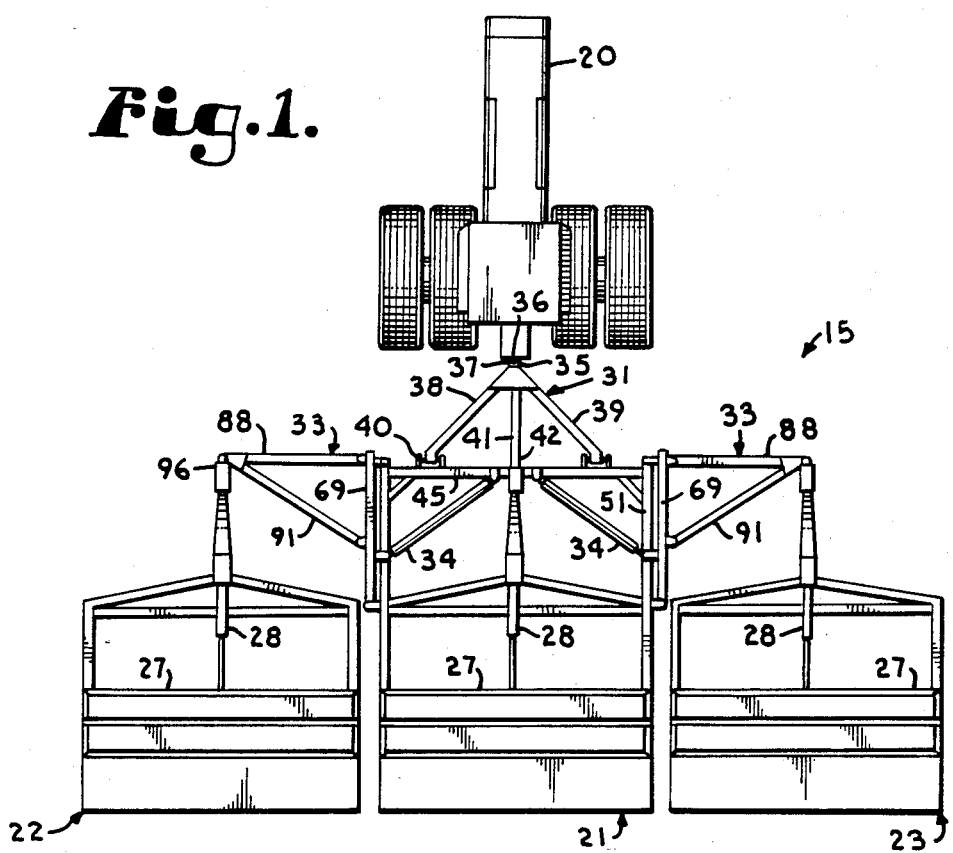
FIG. 1 is a top plan view of a tow frame embodying the present invention, shown in a field configuration hitched to a tow vehicle and first, second and third implements.
Figure 2:
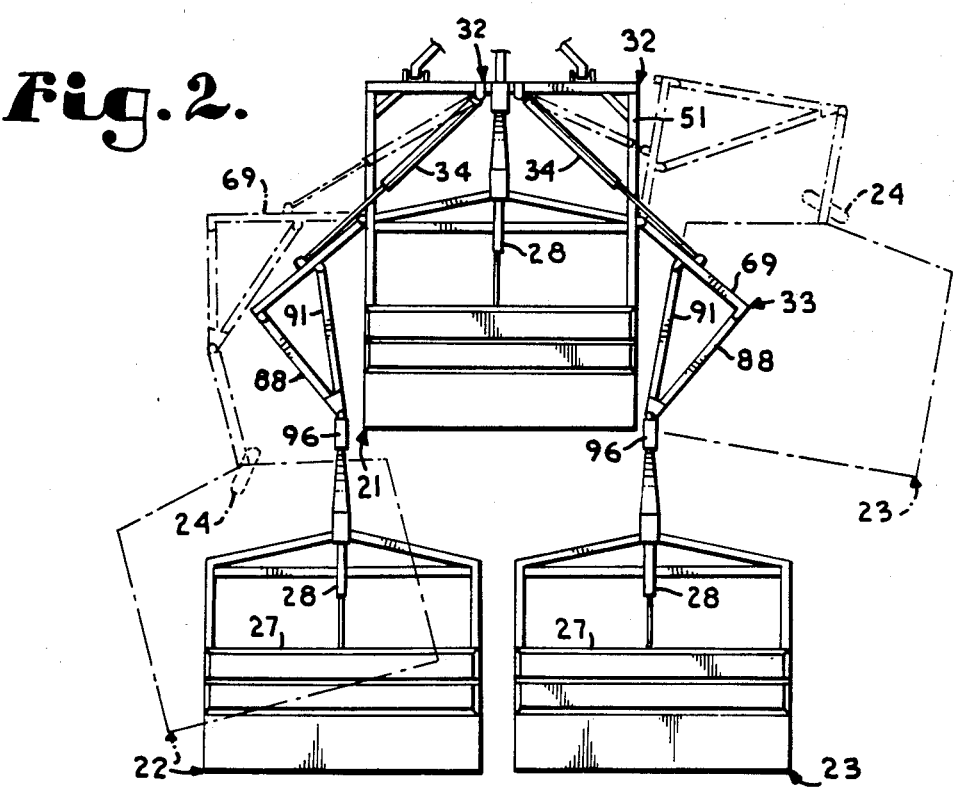
FIG. 2 is a top plan view of the tow frame, shown folded to a transport configuration in solid lines and in an intermediate folding stage in broken lines.

Without limitation on the possible orientations of the tow frame embodying the present invention, front and back generally mean with respect to the direction of travel, i.e. towards the top of the page in FIGS. 1 and 2 and to the left in FIGS. 3 and 4.

Referring to the drawings in more detail, the reference numeral 15 generally designates a tow frame embodying the present invention. The tow frame 15 may be drawn by, for example, a tow vehicle such as a tractor 20. The tow frame 15 may be utilized to pull a variety of different implements, including first (middle), second (left side) and third (right side) seed drills 21, 22 and 23. The seed drills 21, 22 and 23 may comprise, for example, John Deere Model No. 9300 grain drills, which are available from Deere & Company of Moline, Ill. Such seed drills are used for planting row crop seed and may include front gauge wheels 24, shoes 25 for opening the earth to receive the seed deposits, and press wheels 26 for closing the earth over the planted seeds. Seed boxes or hoppers 27 are located above the shoes 25. Seed dispensing mechanisms (not shown) are normally provided for metering desired quantities of seeds into the open furrows in the field. Seed drills are also available which dispense fertilizer to facilitate seed germination. The drills 21, 22 and 23 may be provided with hydraulic piston-and-cylinder units 28 for raising and lowering between lowered field positions (FIG. 3) with their shoes 25 embedded in the ground and raised transport positions (FIG. 4) with their shoes 25 disengaged.

Although a specific type of shoe drill is shown for use with the tow frame 15 of the present invention, it will be appreciated that various other types of implements, including other types of planters, can be drawn by tow frames embodying the present invention. For example, planters are available with disks for opening the ground slots or furrows in lieu of the shoes 25. The planters and their various components are selected to maximize yield for various crops and field conditions.

The tow frame 15 of the present invention generally comprises a yoke subframe 31, a primary or central subframe 32 and a pair of wing subframes 33.

II. Yoke Subframe 31

The yoke subframe 31 includes a tongue 35 mounting a hitch 36 at a front end 37 thereof for attachment to the tractor 20. An A-frame 38 extends rearwardly from the tongue 35 and includes a pair of rearwardly-diverging side legs 39 terminating at side leg rear ends 40 and a center leg 41, which may comprise an extension of the tongue 35, terminating at a center leg rear end 42.

III. Primary Subframe 32

The primary subframe 32 includes a front, transverse, tubular drawbar 45 with opposite ends 46. The drawbar 45 may be pivotally connected to the yoke subframe 31, for example by three clevis-type hinge assemblies 47 each including a transverse hinge pin 48 extending along a horizontal, transverse pivotal axis located slightly in front of and extending in parallel relation with respect to the drawbar 45. The yoke and primary subframes 31, 32 are thus adapted to flex with respect to each other. A pair of side members 51 extend rearwardly from the drawbar 45, each side member 51 including a front end 52 fastened to a respective drawbar opposite end 46 and a rear end 53 mounting a T-flange 54 which is perpendicular to the side member 51.

A pair of double-clevis hinge brackets 57 are each mounted on a respective side member T-flange 54. Each hinge bracket 57 includes a generally vertical front plate 58 which is fastened, for example by bolting, to a respective T-flange 54. Upper and lower pairs of horizontal clevis plates 59 are fastened to and extend rearwardly from the front plate 58. The clevis plate pairs form upper and lower clevis receivers 60, 61. A vertical back plate 62 is mounted, for example by welding, on the clevis plates 59 and may be positioned in parallel, spaced relation rearwardly from the front plate 58 for attachment, for example by bolts 63, to the first seed drill 21.

IV. Wing Subframes 33

Each wing subframe 33 includes a proximate end 67 pivotally connected to a respective hinge bracket 57 and a distal end 68. Each wing subframe 33 further includes a swing arm or proximate member subassembly 69 comprising upper and lower swing arm beams or tubes 71, 72 with proximate end sleeves 73, 74 pivotally received in the hinge bracket clevis upper and lower receivers 60, 61 respectively and forming the wing subframe proximate end 67. A hinge pin subassembly 78 includes a plate 79 fastened (e.g. bolted) to the topmost clevis plate 59 and a wing subframe hinge pin 85 extending through the clevis plates 59 and the sleeves 73, 74.

The swing arm tubes 71, 72 terminate at outer ends 75, 76 respectively. The swing arm tubes 71, 72 extend substantially parallel to each other for most of the lengths of the swing arms 69 and are separated by spacers 77. At their outer ends 75, 76 the swing arm tubes 71, 72 converge. Each lower swing arm tube 72 mounts a locking assembly 80 in proximity to its outer end 76, the locking assembly 80 comprising a pair of lock bars 81 fastened above and below the lower swing arm tube 72. The lock bars 81 project inwardly (with the swing arm 69 folded alongside a respective side member 51) from the swing arm lower tube 72 and include diverging ends 82 with locking pin receivers 83. Each locking assembly 80 includes a locking pin 84 adapted for selective placement in the locking pin receivers 83 on the inside of a respective side member 51 whereby the side member 51 is releasably captured between the locking pin 84 on the inside, the lock bars 81 above and below, and the juxtaposed lower swing arm tube 72 on the outside in a field or working configuration (FIGS. 8 and 9). Alternatively, the lock bars 81 may project from the side members 51 and lockably receive the lower swing arm tubes 72.

Each swing arm 69 mounts a respective wing A-frame 87 including a distal extension member 88 with inner and distal ends 89, 90 and a diagonal brace member 91, also with inner and distal ends 92, 93. The extension and brace member inner ends 89, 92 may be pivotally connected to the swing arm lower tubes 72, for example, by clevis-type hinge assemblies 94 defining horizontal, aligned pivot axes extending in parallel relation slightly outwardly from the swing arm lower tubes 72. Each wing A-frame 87 is thus articulated with respect to the primary subframe 32 about such aligned pivotal axes of the hinge assemblies 94.

With the wing subframe 33 in its field or working position, each extension member 88 forms approximately a right angle with respect to a respective swing arm 69, and each brace member 91 extends diagonally from a respective hinge assembly 94 located between the swing arm lower tube ends 74, 76 to the extension member distal end 90 at the wing subframe distal end 68. At the wing subframe distal end 68, the extension and brace member distal ends 90, 93 may be connected by a gusset plate 95. A wing hitch assembly 96 is provided at each wing subframe distal end 68 for hitching to a respective second or third implement 22, 23.

Actuating System 34

The actuating system 34 includes a pair of piston-and-cylinder units 100 each having inner and outer ends 101, 102. A respective clevis-type hinge assembly 104 mounts each piston-and-cylinder unit inner end 101 to the drawbar 45 and includes upper and lower plates 105, 106 for releasably clamping to the drawbar 45 with bolts 107. The locations of the hinge assemblies 104 are thus slidably adjustable along the drawbar 45.

The piston-and-cylinder unit outer ends 102 are likewise pivotally and adjustably connected to the swing arm upper tubes 71 by clevis type hinge assemblies 110. The hinge assemblies 110 may be located between the swing arm upper tube proximate ends 73 and the wing brace member inner ends 92, and their positions are slidably adjustable along the swing arm upper tubes 71.

A pair of hydraulic lines 115 extend from a source of hydraulic fluid pressure, which may be provided on the tractor 20, and communicate with the piston-and-cylinder units 100. Although double-acting (extendable and retractable) hydraulic piston-and-cylinder units 100 are shown, other types of linear actuators may be provided. For example, single-acting hydraulic or pneumatic units could be employed. Further, jack assemblies with telescoping tubes reciprocated by screw-threaded rods are available from Barker Manufacturing Company of Battle Creek, Mich. The threaded rods are driven by electric motors which could draw power from the electrical system of the tractor 20.

VI. Operation

The tow frame 15 is shown in a field configuration in FIGS. 1, 3 and 5 with the wing subframes 33 extending laterally from the primary subframe 32. In this configuration the lock assemblies 80 secure the swing arms 69 to the primary subframe side members 51. The tow frame 15 is articulated about a transverse pivotal axis extending through the hinge assemblies 47 in front of the drawbar 45 whereby relative rotation is permitted between the yoke and primary subframes 31, 32. The tow frame 15 is also articulated about longitudinal pivotal axes that extend through the hinge assemblies 94 whereby the wing A-frames 87 are relatively pivotable with respect to the swing arms 69. Thus, the tow frame 15 is designed in operation to conform to various field conditions, for example unlevel ground conditions, whereby the implements 21, 22 and 23 may normally be in position for effectively working the field.

Implements of various widths may be used in conjunction with tow frames 15 embodying the present invention. With the tow frame 15 in its field configuration, the combined widths of the implements 21, 22 and 23 provide a total, field-working width which is approximately three times the width of an individual implement. Although such a maximum width potential is highly desirable for efficient operation, the width of the tow frame 15 in its field configuration may exceed a practical width which could be conveniently transported on a roadway or driven into a barn or other storage building.

To facilitate transporting and storing the tow frame 15 and the implements 21, 22 and 23, the tow frame 15 may be relatively easily folded from its field configuration (FIGS. 1, 3 and 5) to a transport configuration (FIGS. 2, 4 and 6). Folding is accomplished by removing the locking pins 84 from the locking assemblies 80 and extending the piston-and-cylinder units 100 whereby the wing subframes 33 pivot with respect to the primary subframe 32 about respective pivotal axes that extend vertically through the hinge assemblies 56. With the tow frame 15 in a transport configuration, the hinge assemblies 56 are substantially longitudinally aligned with the wing hitch assemblies 96. Thus, when the tow frame 15 is pulled, the wing subframes are primarily placed in tension.

The piston-and-cylinder units 100 may be closed against fluid flow therethrough in their extended positions to assist in retaining the wing subframes 33 in their transport positions, but when the tow frame 15 is pulled straight in a forward direction little or no force is exerted on the piston-and-cylinder units 100 because of the aforementioned alignment of the hinge assemblies 56 and the wing hitch assemblies 96. By thus aligning the hinge assemblies 56 and the wing hitch assemblies 96, most of the force associated with pulling the second and third implements 22, 23 is transmitted to the hinge assemblies 56 as a pulling force in a direction directly rearward.

With the tow frame 15 in its transport configuration (FIG. 2), its overall width, including the second and third implements 22, 23, is about two-thirds of its overall width with the implements 21, 22 and 23 in their field configurations (FIG. 1). The tow frame in its transport configuration is thus better adapted for travel over roadways and also for placement in storage facilities.

If a further width reduction is desired, one of the second or third implements 22, 23 can be unhitched and the corresponding wing A-frame 87 folded upwardly out of the way. The resulting assemblage may thus assume an overall width somewhat less than that of the assemblage with all three implements 21, 22, 23 and the tow frame 15 in a tow configuration.

It is to be understood that while certain forms of the present invention have been illustrated and described herein, it is not to be limited to the specific forms or arrangement of parts described and shown.

What is claimed and desired to be secured by Letters Patent is as follows:

1. A folding frame for towing first and second implements, which comprises:
   (a) a primary subframe including:
      (1) a front, transverse drawbar with opposite ends;
      (2) a side member extending rearwardly from one of said drawbar ends; and
      (3) hitch means adapted for hitching one of said implements to said drawbar;
   (b) a wing subframe including:
      (1) a proximate end pivotally connected to said primary subframe side member; and
      (2) a distal end including hitch means adapted for hitching said second implement to said wing subframe distal end;
   (c) said wing subframe being pivotable about its proximate end with respect to said primary subframe between a field position with said wing subframe extending substantially laterally from said primary subframe and with said implements being substantially transversely aligned, and a transport portion with said wing subframe trailing its connection with said primary subframe and with said second implement located at least partly behind and trailing said first implement; and
   (d) connector means adapted for lockably connecting said wing subframe to said primary subframe with said wing subframe in its field position.

2. The tow frame according to claim 1 wherein said wing subframe includes:
   (a) a proximate member including said proximate end and a proximate member outer end; and
   (b) a distal member including said wing subframe distal end and a distal member inner end; and
   (c) said proximate member outer end and said distal member inner end being hingedly connected and pivotable with respect to each other about a pivotal axis extending substantially parallel to said proximate member.

3. The tow frame according to claim 2 wherein said wing subframe includes:
   (a) a diagonal brace member with an inner end connected to said proximate member between said wing subframe proximate end and said proximate member outer end; and
   (b) an outer end connected to said distal member outer end.

4. The tow frame accord to claim 3 wherein:
   (a) said brace member inner end is hingedly connected to said proximate member and is pivotable with respect thereto about a pivotal axis extending substantially parallel to said proximate member; and
   (b) said brace member outer end is fixedly connected to said distal member outer end.

5. The tow frame according to claim 1, which includes:
   (a) a linear actuator interconnecting said primary and wing subframes, said linear actuator being adapted for folding and unfolding said wing subframe between its field and transport positions.

6. The tow frame according to claim 5 wherein:
   (a) said linear actuator comprises a double-acting hydraulic cylinder.

7. The tow frame according to claim 1, which includes:
   (a) said subframe connector means comprising upper and lower locking bars mounted on one of said side member and said wing subframe, said locking bars being adapted to selectively receive the other of said side member and said wing subframe with said wing subframe in its field position; and
   (b) lock means adapted for selectively retaining said other of said side member and said wing subframe between said lock bars.

8. A tow frame for connecting first, second and third implements to a tow vehicle, which comprises:
   (a) a yoke subframe adapted for hitching to said tow vehicle;
   (b) a primary subframe, which includes:
      (1) a transverse drawbar connected to said yoke subframe and including opposite ends;
      (2) a pair of side members each having a front end connected to a respective drawbar end and a back end connected to said first implement; and
      (3) hitch means adapted for hitching said first implement to said drawbar.
   (c) a pair of wing subframes each including:
      (1) a proximate end hingedly connected to a respective side member in proximity to its back end;
      (2) a distal end;
      (3) a proximate member including said proximate end and an outer end;
      (4) lock means located in proximity to said side member front end and adapted for selectively locking said proximate member to a respective side member with said tow frame in a field configuration;
      (5) a distal member including said distal end and an inner end connected to said proximate member outer end; and
      (6) hitch means adapted for hitching said distal member distal end to one of said second and third implements; and
   (d) said tow frame being foldable between a field position with said hitch means substantially transversely aligned and said implements substantially transversely aligned, and a transport configuration with said proximate and distal ends of said wing subframes substantially longitudinally aligned and said second and third implements at least partly behind said first implement.

9. The tow frame according to claim 8 wherein said wing subframe includes:
   (a) said proximate member outer end and said distal member inner end being hingedly connected and pivotable with respect to each other about a pivotal axis extending substantially parallel to said proximate member.

10. The tow frame according to claim 9 wherein said wing subframe includes:
   (a) a diagonal brace member with an inner end connected to said proximate member between said wing subframe proximate end and said proximate member outer end; and
   (b) an outer end connected to said distal member outer end.

11. The tow frame according to claim 10 wherein:
   (a) said brace member inner end is hingedly connected to said proximate member and is pivotable with respect thereto about a pivotal axis extending substantially parallel to said proximate member; and
   (b) said brace member outer end is fixedly connected to said distal member outer end.

12. The tow frame according to claim 8, which includes:
   (a) a linear actuator interconnecting said primary and wing subframes, said linear actuator being adapted for folding and unfolding said wing subframe between its field and transport positions.

13. The tow frame according to claim 12 wherein:
   (a) said linear actuator comprises a double-acting hydraulic cylinder.

14. The tow frame according to claim 8 wherein each said lock means includes:
   (a) upper and lower locking bars mounted on one of said side member and said wing subframe, said locking bars being adapted to selectively receive the other of said side member and said wing subframe with said wing subframe in its field position; and
   (b) said lock means being adapted for selectively retaining said other of said side member and said wing subframe between said lock bars.

15. A tow frame for connecting first, second and third implements to a tow vehicle, which comprises:
   (a) a yoke subframe including:
      (1) a front end adapted for hitching to a tow vehicle;
      (2) an A-frame including a pair of side legs connected to said yoke subframe front end and diverging rearwardly to a pair of rear ends; and
      (3) a center leg extending from said front end to a rear end between said side leg rear ends;
   (b) a primary subframe including:
      (1) a drawbar with opposite ends, said yoke subframe rear ends being pivotably mounted on said drawbar whereby said yoke subframe and said primary subframe are pivotable with respect to each other about a transverse pivotal axis extending substantially parallel to said drawbar;
      (2) a pair of side members each having a front end connected to a respective drawbar opposite end and a rear end adapted for connection to said first implement; and
      (3) a pair of gussets each interconnecting a respective drawbar opposite end and a respective side member front end;
   (c) a pair of wing subframes each including:
      (1) a proximate end pivotally connected to a respective side member rear end;
      (2) a distal end;
      (3) a proximate member including said proximate end, an outer end and upper and lower proximate members positioned in spaced relation at said proximate end and converging at said outer end; and
      (4) a wing A-frame including a distal member with an inner end pivotally connected to said proximate member outer end and a diagonal brace member pivotally connected to said proximate member between said wing subframe proximate end and said proximate member outer end, said distal and brace members converging at said wing subframe distal end;
   (d) a pair of wing subframe retaining assemblies each including:
      (1) a pair of bars connected to a respective wing subframe lower proximate member with said lower proximate member therebetween, said bars extending inwardly above and below a respective primary subframe side member with said tow frame in its field configuration, each said bar including a locking pin receiver; and
      (2) a pair of locking pins each adapted for placement in a respective pair of locking pin receivers inside a respective primary subframe side member whereby a respective wing subframe is retained in its field configuration with a respective wing subframe proximate member adjacent and parallel to a respective primary subframe side member;
   (e) a pair of hitches each mounted on a respective wing subframe distal end and adapted for hitching to one of said second and third implements;
   (f) a pair of fluid-actuated piston-and-cylinder units each having a first end connected to said drawbar and a second end connected to a respective proximate member subassembly between its outer end and a respective wing subframe proximate end; and
   (g) said tow frame being movable by said piston-and-cylinder units between a field configuration with said wing subframe proximate members each locked alongside and substantially parallel to a respective primary subframe side member and said implements substantially transversely aligned, and a transport configuration with said wing subframe proximate and distal ends substantially longitudinally aligned and said second and third implements at least partly behind said first implement.

* * * * *